United States Patent [19]

Frencken et al.

[11] Patent Number: 4,604,651
[45] Date of Patent: Aug. 5, 1986

[54] TELEVISION CIRCUIT ARRANGEMENT FOR FIELD AND LINE FREQUENCY DOUBLING AND PICTURE PART MAGNIFICATION

[75] Inventors: Peter H. Frencken; Johannes G. Raven; Marcellinus J. J. C. Annegarn, all of Eindhoven, Netherlands

[73] Assignee: U.S. Philips Corporation, New York, N.Y.

[21] Appl. No.: 552,656

[22] Filed: Nov. 17, 1983

[30] Foreign Application Priority Data

Dec. 7, 1982 [NL] Netherlands .................. 8204728

[51] Int. Cl.⁴ ................. H04N 3/22; H04N 7/01
[52] U.S. Cl. ........................... 358/140; 358/180
[58] Field of Search ............ 358/140, 12, 180

[56] References Cited

U.S. PATENT DOCUMENTS

| | | | |
|---|---|---|---|
| 4,429,327 | 1/1984 | Oakley | 358/12 |
| 4,435,728 | 3/1984 | Raven | 358/140 |
| 4,496,974 | 1/1985 | Heitmann | 358/180 |

*Primary Examiner*—Howard W. Britton
*Attorney, Agent, or Firm*—Thomas A. Briody; William J. Streeter; Edward W. Goodman

[57] ABSTRACT

In a television circuit arrangement for field and line frequency doubling and picture part magnification (zooming), in order to obtain the frequency doubling, information is written, alternately, into two field memories (M1, M2) during a field period having line periods at a given writing speed (clock frequency fc), whereby the reading from the field memories takes place at twice the writing speed. For a picture part magnification to be carried out in a simple manner, a magnification control circuit (TG, S3, S4, S11, S12) having a clock signal change-over circuit (S3, S4) is provided, as a result of which during writing, a higher writing speed (clock frequency 2fc) than the said given writing speed (clock frequency fc) is used during a part of the field periods and of the line periods, which part is substantially inversely proportional to the ratio between the higher writing speed and the given writing speed. For intermittent writing, one or more change-over circuits (S11, S12) are provided at the memory signal inputs, which provides, besides a more effective information storage and an improvement of the picture quality, the possibility of movement detection and recursive signal processing for noise reduction.

11 Claims, 10 Drawing Figures

TELEVISION CIRCUIT ARRANGEMENT FOR FIELD AND LINE FREQUENCY DOUBLING AND PICTURE PART MAGNIFICATION

BACKGROUND OF THE INVENTION

The invention relates to a television circuit arrangement for field and line frequency doubling and picture part magnification, which circuit arrangement comprises a signal input for receiving information and a signal output for supplying information, first and second field memories which are arranged in parallel between the signal input and the signal output and are each provided with a signal input, a signal output and a clock signal input, a write/read circuit having a clock signal source and suitable for writing information during alternate field periods, each field period comprising line periods, into the first and the second field memory, respectively, in a field period as writing time at a given writing speed and for reading the information twice from the respective field memory during the following field period as reading time at a reading speed which is substantially twice the writing speed, which television circuit arrangement is further provided with a magnification control circuit for obtaining picture part magnification, this control circuit being coupled to the field memories.

A circuit arrangement of this kind has been described in an article in the Dutch magazine "Electronica" 1982, No. 4, on pages 27, 29, 31 and 33. In the article, in two figures on page 31, receiver designs with flicker reduction are shown, for which purpose field frequency doubling is utilized. To this end, the write/read circuit comprises microprocessor control, it being noted that the use thereof is particularly advantageous if additional effects are to be realized, such as, for example, electronic "zooming", i.e. picture part magnification. The article only states that this requires a complicated address calculation, while further data about the construction of the the required magnification control circuit are not given at all.

SUMMARY OF THE INVENTION

The invention has for its object to provide a magnification control circuit in the television circuit arrangement for field and line frequency doubling and picture part magnification which operates without complicated address calculations and with a minimum of modifications of and additions to the known television circuit arrangement for obtaining flicker reduction. Therefore, a television circuit arrangement according to the invention is characterized in that the magnification control circuit is provided with a clock signal change-over circuit which is coupled to the first and to the second field memory, whereby during the writing of information into the respective first and second field memory, the writing speed is higher than the given writing speed, during a part substantially inversely proportional to the ratio between the higher writing speed and the given writing speed of the field periods and of the line periods in the writing time.

For obtaining a magnification of an arbitrary picture part, an embodiment of a television circuit arrangement according to the invention is characterized in that the inversely proportional part of the field periods and of the line periods is displaceable in the periods.

For obtaining a maximum picture part magnification when the reading speed is the optimum maximum speed during the signal processing in the field memories, an embodiment is characterized in that the higher writing speed is substantially equal to the reading speed.

For obtaining an optimum utilization of the information storage possibility in the field memories, an embodiment of a television circuit arrangement according to the invention is characterized in that the signal input of at least one of the two field memories is coupled to a further change-over circuit forming part of the magnification control circuit, as a result of which during the inversely proportional part of the field periods and of the line periods, the process of writing into the memory at the higher writing speed is effected intermittently and leads to an effective information writing time in the field memory which is equal to substantially half the inversely proportional part of the field periods and of the line periods.

A further embodiment suitable for picture part magnification in a moving television picture is characterized in that the first and the second field memories are each coupled to a further first and second change-over circuit provided with at least a first and a second signal input, which inputs can be both intermittently connected to a signal output thereof, whereby the respective first and the second signal inputs of the first and the second change-over circuits is coupled to the signal input of the television circuit arrangement and to the signal output of the other field memory, respectively.

In order to obtain the possibility that information supplied to the signal input of the television circuit arrangement at a variable speed can be stored in the field memories in an adapted manner, an embodiment of the television circuit arrangement according to the invention is characterized in that the magnification control circuit is provided with a first and a second clock signal source, which are both connectable via the clock signal change-over circuit to the clock signal input of the first and that of the second field memory and determine the writing and reading speed therein and which further determine the intermittent writing in the said further first and second change-over circuits, the first and second clock signal sources being respectively constructed as a non-synchronized and a synchronized clock signal source, respectively, the second synchronized clock signal source being operative with that further change-over circuit and that field memory, of which the memory signal input is connected intermittently to the signal input of the television circuit arrangement.

A further simple embodiment in which there is a picture part magnification by a factor 2×2, is characterized in that via the clock signal change-over circuit, the non-synchronized first clock signal source and the synchronized second clock signal source are operative with the first and second field memories and the further first and second change-over circuits with a period shifted through a field period and comprising two field periods, after the synchronized second clock signal source operative during half a field period the nonsynchronized first clock signal source being operative during three half field periods with the field memories and the change-over circuits.

In order to provide the possibility of utilizing during the picture part magnification, a movement detection and/or a recursive signal processing for, for example, noise suppression, a further embodiment is characterized in that the television circuit arrangement is provided with three further signal outputs which are connected to the signal output of the first field memory, to the signal output of the second field memory and to the signal input of the television circuit arrangement, respectively.

Another embodiment suitable for picture part magnification with a stationary television picture is characterized in that the first field memory is repeatedly periodically readable with respect to information derived from the signal input of the television circuit arrangement and stored in the memory, the second field memory being coupled to the further change-over circuit which is provided with at least a first and a second signal input, of which at least the second signal input can be intermittently connected to a signal output thereof, whereby the first and second signal input of the change-over circuit is respectively coupled to the signal input of the television circuit arrangement and to the signal output of the first field memory.

In dependence upon the particular construction of the field memories, the signal processing for the picture part magnification carried out in accordance with the invention can be effected in different ways. A possible embodiment of a television circuit arrangement according to the invention is characterized in that the first and the second field memory are each respectively constructed as a memory that can be stopped without a substantial loss of information, whereby, in the writing time outside the inversely proportional part of the field periods and of the line periods, the clock signal supply, via the clock signal change-over circuit, is interrupted.

Another embodiment is characterized in that the first and the second field memory are each respectively constructed as a circulating memory, whereby, in order to obtain a continuous circulation after the inversely proportional part of the field periods and of the line periods until there is read twice in a field period, via the clock signal change-over circuit, a clock signal supply for simultaneous reading and writing takes place which is sufficient for a single circulation.

A further embodiment with a picture part magnification by a factor 2×2, in which only the given writing speed and the double value thereof (the reading speed) occur with the use of circulating memories, is characterized in that the single circulation in the respective first and the second field memory, is effected with a circulation time within which, in a part thereof, the reading/writing speed is equal to the reading speed and, in the remaining part thereof, the reading/writing speed is equal to the given writing speed, the average value of the two reading/writing speeds being sufficient for the single circulation.

DESCRIPTION OF THE DRAWINGS

The invention will be described more fully, by way of example, with reference to the accompanying drawings, in which.

DESCRIPTION OF THE PREFERRED EMBODIMENTS

Figure 1:
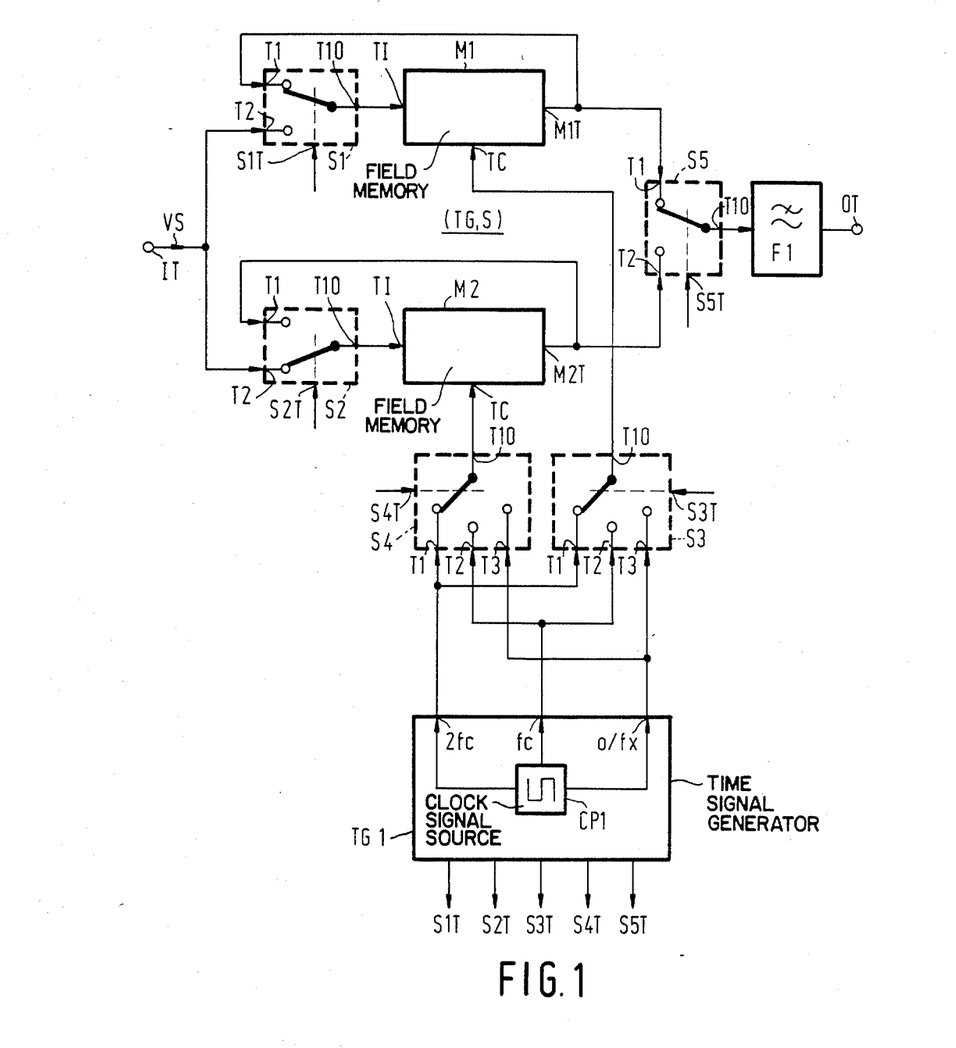
FIG. 1 shows an embodiment of a television circuit arrangement according to the invention.

In an embodiment of a television circuit arrangement according to the invention shown in FIG. 1, IT designates a signal input for receiving information, which supply of information takes place in the form of a signal VS. The signal VS is, for example, a picture signal to be supplied by a television pick-up device, a video signal formed therewith by the addition of line and field synchronizing and suppression pulses or a television signal suitable to be transmitted. In this case, the signal VS may be associated with a monochrome or color television system, which may be defined according to a broadcast standard. Furthermore, the signal VS may be an analog or a digital signal. The specific composition of the signal VS is not essential to the invention and determines only specific constructions of components to be used in the television circuit arrangement. As an analog picture or video signal, the signal VS has, for example, a bandwidth of 0 to 5 MHz. As a digital signal, the signal VS is digitized, for example, with seven or eight bits per sample.

Figure 2:
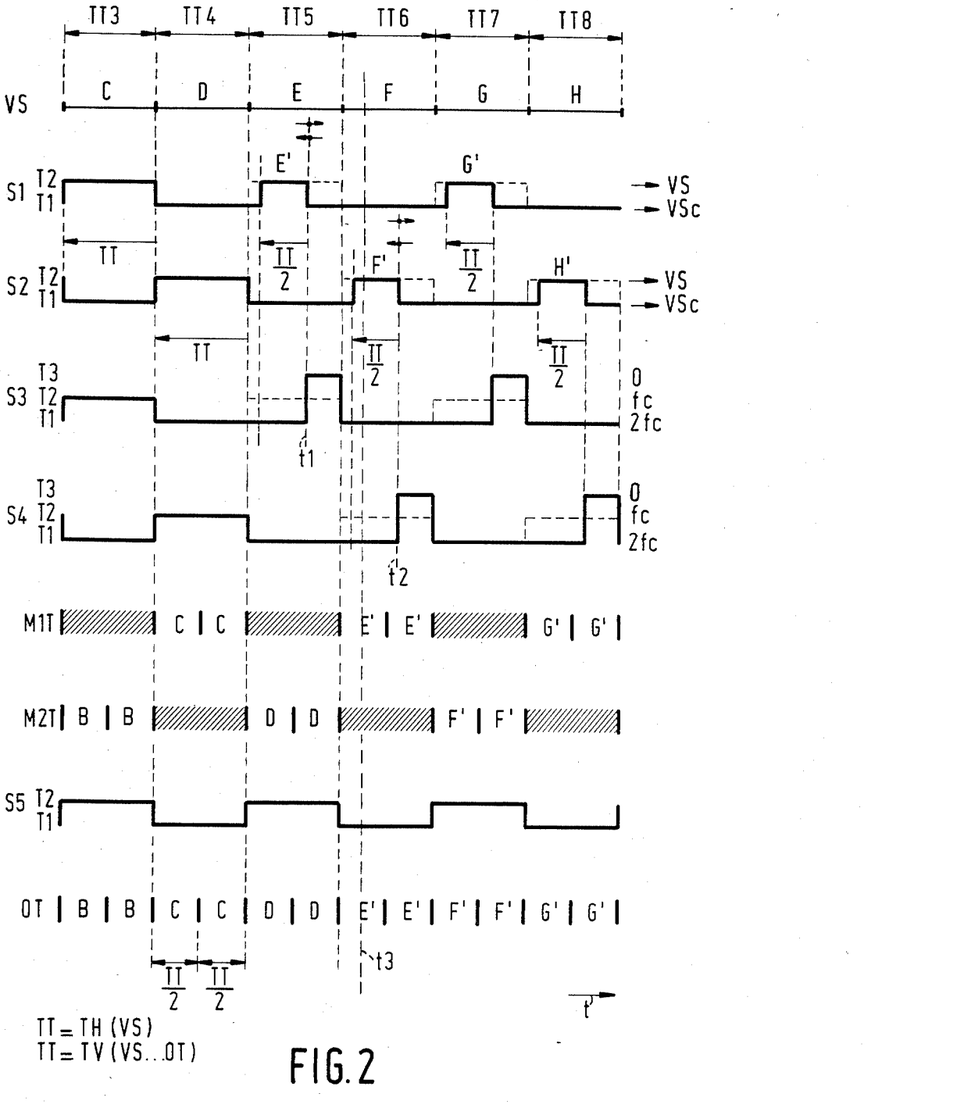
FIG. 2 shows a few diagrams, as a function of time, for explaining a possible signal processing in the circuit arrangement shown in FIG. 1.
Figure 3:
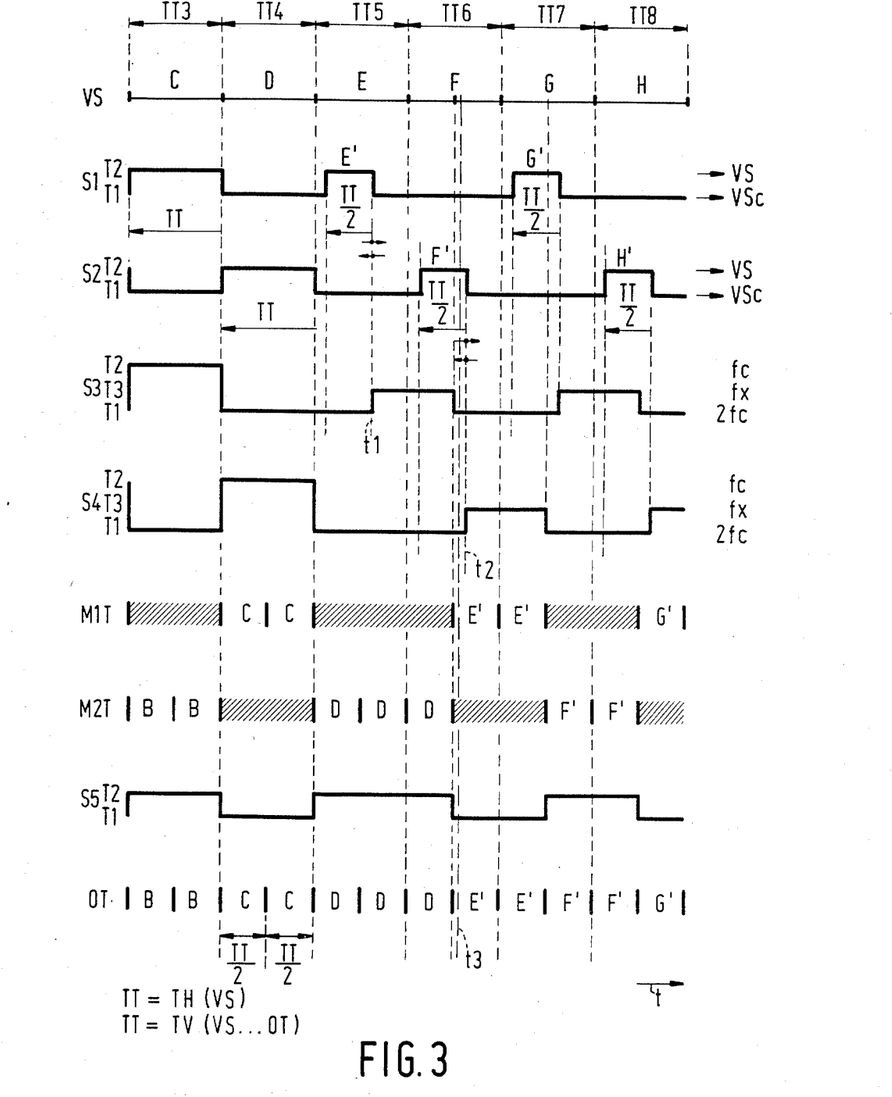
FIGS. 3 and 4 are likewise diagrams associated with possible signal processings in the circuit arrangement shown in FIG. 1.
Figure 4:
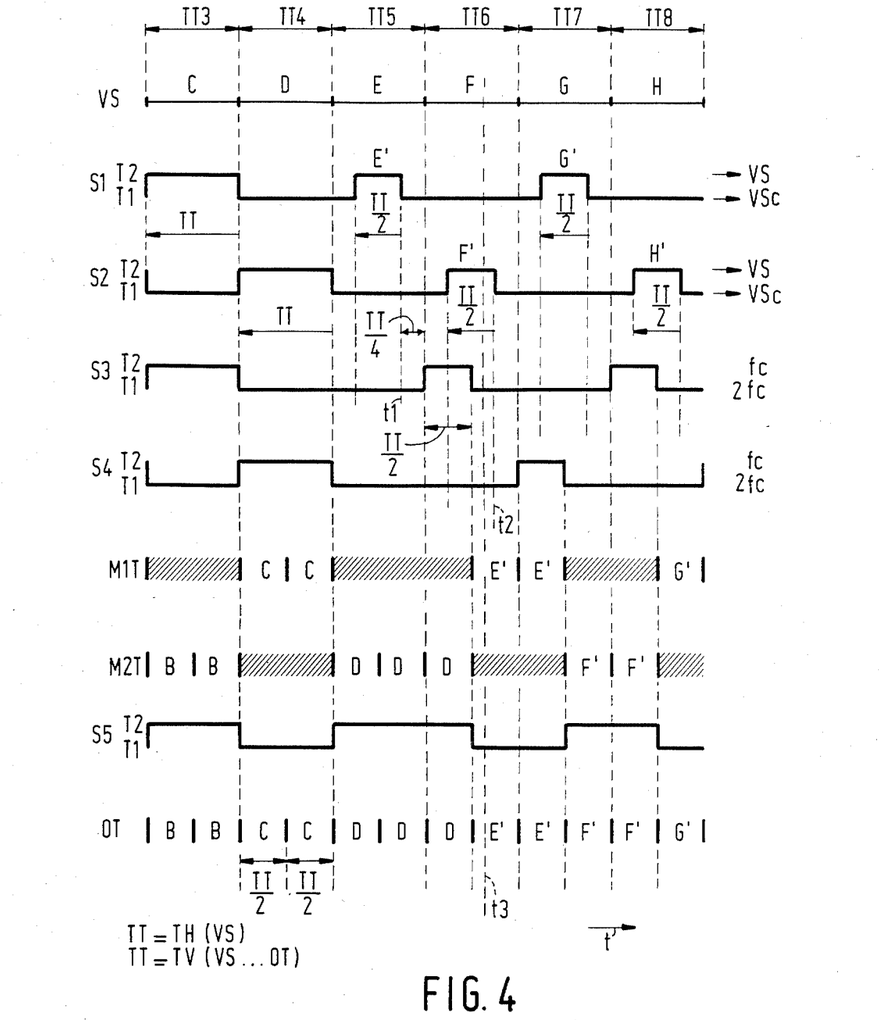

In the FIGS. 2, 3 and 4, diagrams associated with the signal processing in the circuit arrangement of FIG. 1 are shown as a function of time t, the signal VS being drawn with information C,D,E,F,G and H present in periods TT3, TT4, TT5, TT6, TT7 and TT8, respectively. The period TT may be a television line period for the signal VS in which case TT=TH. A line period TH comprises a line scanning time and a line blanking time in which a line synchronization pulse may occur. The period TT may further be a television field period in which case TT=TV. Thus, the VS diagrams in the diagram Figures are to be considered on the line time base (TT=TH) or on the field time base (TT=TV), in which event the information C, D, E etc. of the signal VS represent line or field video informations, respectively. The field period TV comprises line periods not indicated with line scanning and blanking times outside a field blanking time in which, for example, field synchronization pulses and equalizing pulses according to, for example, a standard occur during a part thereof. It is assumed that in a period TT2 not indicated and preceding the period TT 3, information B is present in the signal VS. The periods TT=TV are associated, for example, with a television system with single or multiple interlacing. In a television system with single interlacing, the information D (TT=TV) forms with the information C or E a single television picture having a picture period equal to 2TV. For a field frequency equal to 50 or 60 Hz, the field period TV is equal to 20 ms or 16.67 ms, whereby per field period TV, for example, 312.5 or 262.5 line periods occur. For the line period TT=TH then TH=64 μs, and TH=63.4 μs, respectively.

The circuit arrangement shown in FIG. 1 is provided with two field memories M1 and M2 which, with a continuous supply and production of information at a given writing/reading speed, have a storage or delay time equal to the field period TV. The field memories M1 and M2 are each provided with a signal input TI, a clock signal input TC and a signal output MT which at the memories M1 and M2 for distinction are designated by M1T and M2T, respectively. In FIGS. 2, 3 and 4, two information diagrams associated with the field memory outputs are likewise designated by M1T and M2T.

The signal input TI of the field memory M1 is connected to a signal output T1O of a change-over circuit S1 which is further provided with two signal inputs T1 and T2 and a change-over input S1T. The change-over circuit S1 (and change-over circuits to be further described) is shown for the sake of simplicity as a mechanical change-over switch, but is constructed in practice as an electronic change-over switch. From a time signal generator TG1, a change-over signal is then supplied to the change-over input S1T, which change-over signal is shown in FIGS. 2, 3 and 4 as a diagram S1 with two levels T1 and T2, At the level T1 or T2 of the diagram S1 shown, the respective signal input T1 or T2 of the change-over circuit S1 shown in FIG. 1 is connected to the output T10 thereof. FIG. 1 shows that the input T1 of the change-over circuit S1 is connected to the output M1T and the input T2 is connected to the signal input IT. Correspondingly, the field memory M2 is coupled to a change-over circuit S2 which is likewise controlled from the time signal generator TG1 and the operation of which is illustrated by the diagram S2 with two levels T1 and T2 shown in FIGS. 2, 3 or 4.

The clock signal input TC of the field memory M1 is connected to a signal output T1O of a change-over circuit S3 which is further provided with three signal inputs T1, T2 and T3 and a change-over input S3T. From the time signal generator TG1, the change-over circuit S3 is controlled via the input S3T by a change-over signal which is shown in FIGS. 2 and 3 by a diagram S3 with three levels T1, T2 and T3. With the diagram S3 of FIG. 4, only the signal inputs T1 and T2 are utilized. Correspondingly, the field memory M2 is coupled to a change-over circuit S4 which is likewise controlled from the time signal generator TG1 and whose operation is illustrated by the diagram S4 with three levels T1, T2 and T3 shown in FIG. 2 and 3 or by such a diagram with two levels T1 and T2 shown in FIG. 4.

The corresponding signal inputs T1, T2 and T3 of the change-over circuits S3 and S4 are interconnected and connected to outputs of the time signal generator TG1 which convey clock signals of clock frequencies 2fc, fc and O/fx, respectively. The clock signals originate from a clock signal source CP1. The clock frequency O/fx indicates with the symbol O that no clock signal is present (FIG. 2, diagrams S3 and S4) or that there is a clock signal of a clock frequency fx (FIG. 3, diagrams S3 and S4). As an example, for the clock frequency fc, in connection with the 7-bit digitization already stated as an example, is a frequency of 18 MHz.

S5 denotes a change-over circuit of which signal inputs T1 and T2, respectively, are connected to the field memory outputs M1T and M2T, respectively. The change-over circuit S5 is provided with a change-over input S5T which is connected to the time signal generator TG1 and to which is supplied a change-over signal for which a diagram S5 with two levels T1 and T2 is shown in FIGS. 2, 3 and 4. The change-over circuit S5 is provided with a signal output T1O which is connected through a filtering circuit F1 to a signal output OT of the television circuit arrangement shown in FIG. 1. The information at the output OT is illustrated in FIGS. 2, 3 and 4 by diagrams OT. The filtering circuit F1 is shown in FIG. 1 as a low-pass filter, but may be constructed as a two-dimensional interpolation filter. With respect to the operation of the circuit arrangement of FIG. 1, there can be distinguished a write/read circuit (TG,S) comprising the time signal generator TG1 and the change-over circuits S1, S2, S3, S4 and S5 and a magnification control circuit (TG1, S3, S4), of which a clock signal change-over circuit (S3, S4) forms part. With respect to the field memories M1 and M2, it is noted that they may be operative as digital or analog memories and may be in the form of a serial memory or a random access memory. Further, the field memories M1 and M2 may be in the form of solid state devices, such as charge transfer devices, charge injection devices (with nondestructive reading) or bubble memory devices. It is essential for the memories M1 and M2 that they can be written during the supply of information and read during the production of information at different speeds under the control of clock signals having suitable clock frequencies.

The operation of the circuit arrangement of FIG. 1 will be explained for the simplest case with reference to the diagrams given in FIG. 2. During the periods TT3 and TT4, the circuit arrangement of FIG. 1 operates in known manner with a field and line frequency doubling. During the period TT3, the information C present in the signal VS is written into the memory M1 because the input T2 of the change-over circuit S1 is connected to its output T1O (diagram S1 of FIG. 2). This writing process is effected under the control of a clock signal at the clock signal input TC at the clock frequency fc, as appears from the diagram S3 of FIG. 2. Considered on the field time base with TT=TV, at the end of the field period TT3=TV3, the field memory M1 is filled entirely with the information C of the signal VS, while from the beginning of the field period TT4=TV4 the field memory M1 is controlled, as appears from the diagram S3 of FIG. 2, by the clock signal of the frequency 2fc. The output M1T is then connected to the signal input TI of the field memory M1, as appears from the diagram S1 of FIG. 2. The field memory M1 and the change-over circuit S1 together constitute a circulating memory (M1, S1), the signal at the output M1T being supplied again to the signal input TI, which in the diagram S1 of FIG. 2 is indicated by the signal VSc (arrow). During the field period TT4=TV4, the output M1T is connected, as appears from the diagram S5 of FIG. 2, to the signal output OT, which thus conveys twice the information C. In the diagram OT of FIG. 2 the repeated emission of information in two half-field periods (TT)/2=(TT)/2 is indicated more fully.

A corresponding description for the signal processing in the field memory M2 and the change-over circuit S2 of FIG. 1 applies to the field period (not shown) TT2=TV2 when writing the information B and reading it twice in the field period TT3=TV3, the latter appearing from the diagrams S2, S4, M2T, S5 and OT of FIG. 2. In the diagrams M1T and M2T of FIG. 2 (and of FIGS. 3 and 4), irrelevant information at the corresponding memory outputs in the circuit arrangement of FIG. 1 is indicated by hatched lines.

If a picture part magnification is not desired, the signal variation described is repeated in the next field periods TT5, TT6, TT7, TT8 (=TV) etc., as is indicated by broken lines in the diagrams S1, S2, S3 and S4 of FIG. 2. In these diagrams of FIG. 2, full lines indicate the signal variation when picture part magnification is carried out indeed. During the field period TT5=TV5, the diagrams S2 and S4 have the signal variation described so that the information D is twice available at the output OT. The diagrams S1 and S3 of FIG. 2 then show a changed signal variation. From the beginning of the field period TT5=TV5, information E is written into the memory M1 by means of a clock signal of the clock frequency 2fc. This means for a field period TT=TV (the field time base) that the memory M1 will have already been filled to capacity with new information after a half-field period (TT)/2=(TT)/2, after which no further storage of the information E takes place. FIG. 2 indicates that at an instant t1, the process of writing into the memory M1 is stopped, as follows from the diagram S3. This results in that that part of the information E is present in the memory M1 which has been supplied up to a half-field period (TT)/2=(TT)/2 earlier, which, in the diagram S1, is indicated by the information E'. During the field period TT5=TV5 of FIG. 2, in the change-over circuit S1 the input T2 should be through-connected during at least the indicated half (field) period $$\frac{TT}{2}\left(=\frac{TV}{2}\right);$$

the through-connection shown in FIG. 2 in the diagram S1 is permitted. During the period (TT)/2=(TT)/2 with the stored information E', it applies that, considered on the line time base $$\left(\frac{TT}{2}=\frac{TH}{2}\right),$$

the signal VS, for example, is also stored. Till the beginning of the field period TT6=TV6, the memory M1 remains stopped, as follows from the diagrams S3 of FIG. 2. From the beginning of the field period TT6=TV6, the memory M1 is read under the control of the clock signal having the clock frequency 2fc so that the information E' becomes available twice in the field period TT6=TV6 at the output OT. During this field period TT6=TV6, information storage takes place in the manner described in the memory M2 which, calculated back from an instant t2, is filled with information F' during the indicated half field period (TT)/2=(TT)/2 (diagrams S4 and S2 of FIG. 2). An instant t3 indicates in FIG. 2 an instant at which the change-over circuits S1, S2, S3, S4 and S5 of FIG. 1 are in the positions shown.

From the beginning of the field period TT7=TV7, the memory M2 passes the information F' to the output OT, whereby during the field period TT7=TV7 the information G' is written into the memory M1 in the manner described, which information becomes available during the field period TT8 =TV8 at the output OT.

At the instants t1 and t2, arrows indicate that they can be shifted in time. The instants t1 and t2 are shown in FIG. 2 in five-eights of a period TT so that the memories M1 and M2 contain, when they are filled to capacity under the control of the clock signal having the clock frequency 2fc, the information in one eight to five-eights of the period TT. Considered on the field time base (TT=TV), this means for a television picture, the information in a horizontal strip of one-eight to five-eights of the picture height. Considered on the line time base (TT=TH), this means for a television picture the information in a vertical strip of one-eigth to five-eigths of the picture width. The overlapping part of the two strips corresponds to the information E', F', G' etc. Thus, during display, one quarter of the original television picture is shown with a magnification by a factor two in the direction of the height and the width.

Hereinbefore a picture part magnification by a factor two or an arbitrarily selectable quarter of the original television picture has been described. The factor of picture part magnification equal to two has been obtained by the doubled writing speed in the memories M1 and M2 under the control of the clock signal having the clock frequency 2fc, which writing process takes place during half the line periods TT=TH and the field periods TT=TV. It applies in general that, when writing into the memories M1 and M2 at an increased speed at a clock frequency a.fc, where a is greater than 1, this process has to be effected in a substantially inversely proportional part (1)/a of the field periods TT=TV and of the line periods TT=TH. Dependent upon the selection of the picture part that has to be displayed with magnification, the parts for writing are positioned in the field periods TT=TV and in the line periods TT=TH. For the picture part selection, the use of a window in the original picture, which can be displaced arbitrarily therein, can be considered. Picture information from outside this window is not stored in the memories M1 and M2 at the increased writing speed.

When the reading speed in the memories M1 and M2, which is twice the (normal) writing speed at the clock frequency fc, is the optimum maximum speed for the signal processing in the memories M1 and M2, the picture part magnification factor of the value two is a maximum. In case higher writing speeds are possible for the memories M1 and M2 proportionally larger picture part magnification factors can be chosen.

With a picture part magnification factor equal to two, it is found that in the memories M1 and M2, half the original picture information is stored, distributed over all the storage locations which correspond to all the picture points of the original picture. As a result, an original picture point information is effectively stored in two storage locations. In the case of original picture point information supplied in analog form to the input IT, during the display of the magnified picture part the picture definition has increased, which is favourable. In the case of an original picture point information supplied in digital form to the input IT, this information occurs twice in the memories M1 and M2, which deteriorates the picture quality when the magnified picture part is displayed. In order to compensate for this, the filtering circuit F1 may be used, which is in the form of a low-pass filter or a two-dimensionally operating interpolartion filter.

The diagrams of FIG. 2 are associated with the embodiment of the field memories M1 and M2, in which the memories can be stopped for some time without any loss of information. In case stopping would be attended with loss of information, the memories M1 and M2 can be controlled according to the diagrams of FIGS. 3 or 4.

It follows from the diagrams S3 and S4 of FIG. 2 that after the instants t1 and t2 the memories M1 and M2 of FIG. 1 are controlled for some time by the clock signal of the clock frequency fx. From the instant t1, in the circulating memory (M1, S1) the information E' is circulated once as far as the center of the period TT6, from which instant the information at the output M1T becomes available at the output OT. In the circulating memory (M2, S2), according to the diagram S4 of FIG. 3, the single circulation takes place from the instant t2 as far as the center of the period TT7. The clock frequency fx lies between the clock frequencies fc and 2fc in dependence upon the occurrence of the instants t1 and t2. In the case of the higher writing speed at the clock frequency 2fc during the period (TT)/2, with the occurrence of the instants t1 and t2 at the centers of the periods TT5 and TT6, respectively, the clock frequency fx will be equal to fc. With the occurrence of the instants t1 and t2 at the end of the periods TT5 and TT6, respectively, the clock frequency fx will be equal to 2fc. For intermediate instants t1 and t2 there follows an intermediate clock frequency.

The diagrams of FIG. 4 are associated with the case in which not a given clock frequency fx, but a combination of the clock frequencies fc and 2fc is used for the single circulation, the average value of these clock frequencies during the single circulation being equal to fx. For a complete circulation, the product of the clock frequency and the duration of the circulation is equal to fc·TT =constant. In the diagram S3 of FIG. 4, it is indicated that during a time TT, the clock signal of the clock frequency 2fc is used for the circulation, while during a time (TT)/2, the clock signal of the clock frequency fc is used for the circulation, whereby it follows that (TT)/4·2fc+(TT)/2·fc=TT·fc. The instant of the change-over of the clock signal thus coincides with the beginning of the next period TT, whereby there is started from a picture part magnification by a factor two of the central (one quarter) part of the picture.

Figure 5:
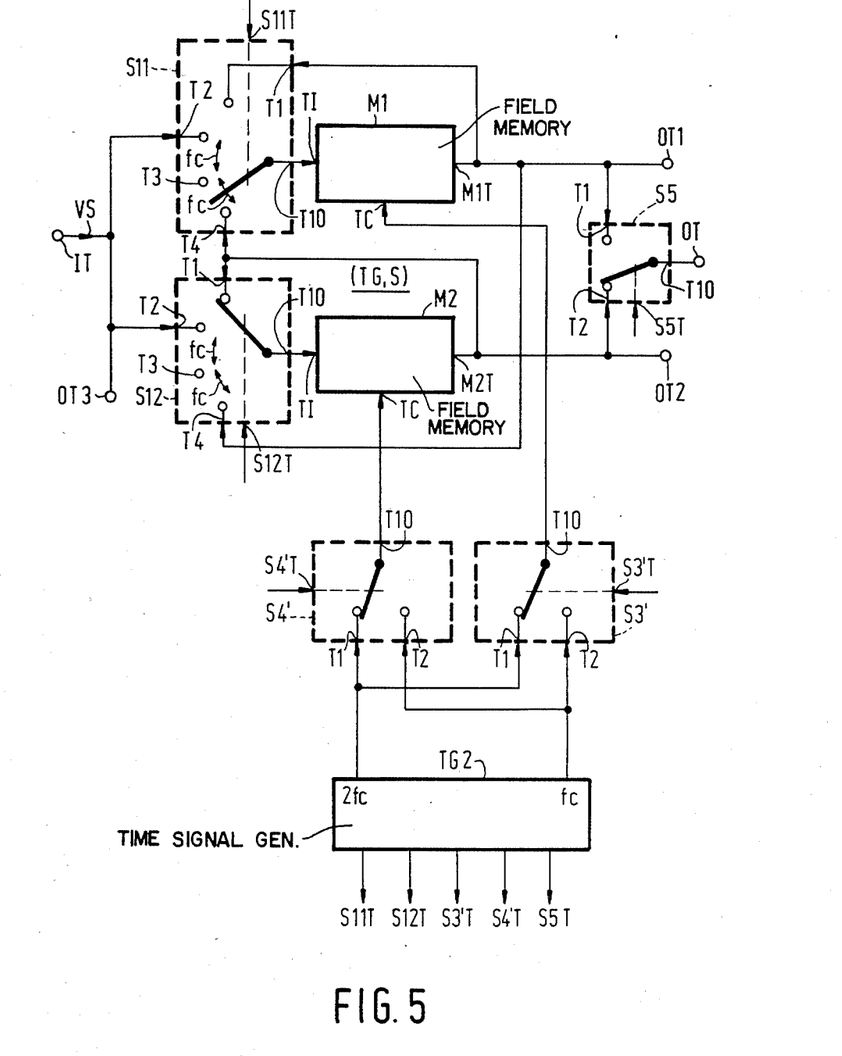
FIG. 5 shows another possible embodiment according to the invention.

In the description of the circuit arrangement shown in FIG. 1 and the associated diagrams of FIGS. 2, 3 and 4, it is indicated that the information at the memory outputs M1T and M2T are alternately utilized, whereby in a digitized signal VS the same information is present in two successive storage locations. In the diagrams M1T and M2T of FIG. 2, 3 and 4, the non-utilized information is indicated by hatched lines. FIG. 5 shows an embodiment of a television circuit arrangement according to the invention, with which the diagrams of FIG. 6 are associated and in which the information storage possibility in the field memories M1 and M2 is utilized to the optimum, while further in the picture part magnification, use may be made of a movement detection and recursive signal processing, such as for noise reduction.

In the circuit arrangement shown in FIG. 5, the field memories M1 and M2 are arranged parallel between the signal input IT and the signal output OT in the manner described with reference to FIG. 1. The change-over circuit S5 is present in unmodified state, while the signal input IT is coupled to the signal inputs TI of the field memories M1 and M2 via respective change-over circuits S11 and S12. The change-over circuits S11 and S12 each have a signal output T10 and three signal inputs T1, T2 and T4, while T3 denotes a switching terminal which has no input. At the terminal T3 and a terminal connected to the input T2 and T4, respectively, an arrow fc indicates that the input T2 and T4, respectively, can be intermittently connected to the signal output T10. The inputs T2 of the change-over circuits S11 and S12 are connected to the signal inputs IT, whereby the inputs T4 of the change-over circuits S11 and S12, respectively, are connected to the signal outputs M2T and M1T, respectively. The signal inputs T1 of the change-over circuit S11 and S12, respectively, are connected to the signal output M1T and M2T, respectively. The signal outputs T10 of the change-over circuits S11 and S12, respectively are connected to the signal inputs TI of the storage memories M1 and M2, respectively. The change-over circuits S11 and S12 are provided with change-over inputs S11T and S12T, which are connected to outputs of a time signal generator TG2. The clock signal inputs TC of the field memories M1 and M2, respectively, are connected to respective signal outputs T10 of change-over circuits S3' and S4' which are provided with two signal inputs T1 and T2 and a change-over input S3'T and S4'T, respectively. The inputs S3'T, S4'T and the interconnected inputs T1 and T2 of the change-over circuits S3' and S4' are connected to outputs of the time signal generator TG2. The inputs T1 and T2 of the change-over circuits S3' and S4' receive the clock signals of the clock frequencies 2fc and fc, respectively. FIG. 6 shows diagrams VS, S11 and S12, both with four levels T1,T2,T3 and T4, S3' and S4' both with two levels T1 and T2, M1T and M2T, S5 with two levels T1 and T2, and OT for the circuit arrangement shown in FIG. 5. The circuit arrangement of FIG. 5 is provided with a write/-read circuit (TG,S) which comprises a magnification control circuit (TG2, S3', S4', S11,S12) in which a clock signal change-over circuit (S3', S4') is present. Further, the circuit arrangement shown in FIG. 5 is provided not only with the signal output OT, but also with three further signal outputs OT1, OT2, and OT3, which are connected to the signal outputs M1T, M2T and the signal input IT, respectively.

Figure 6:
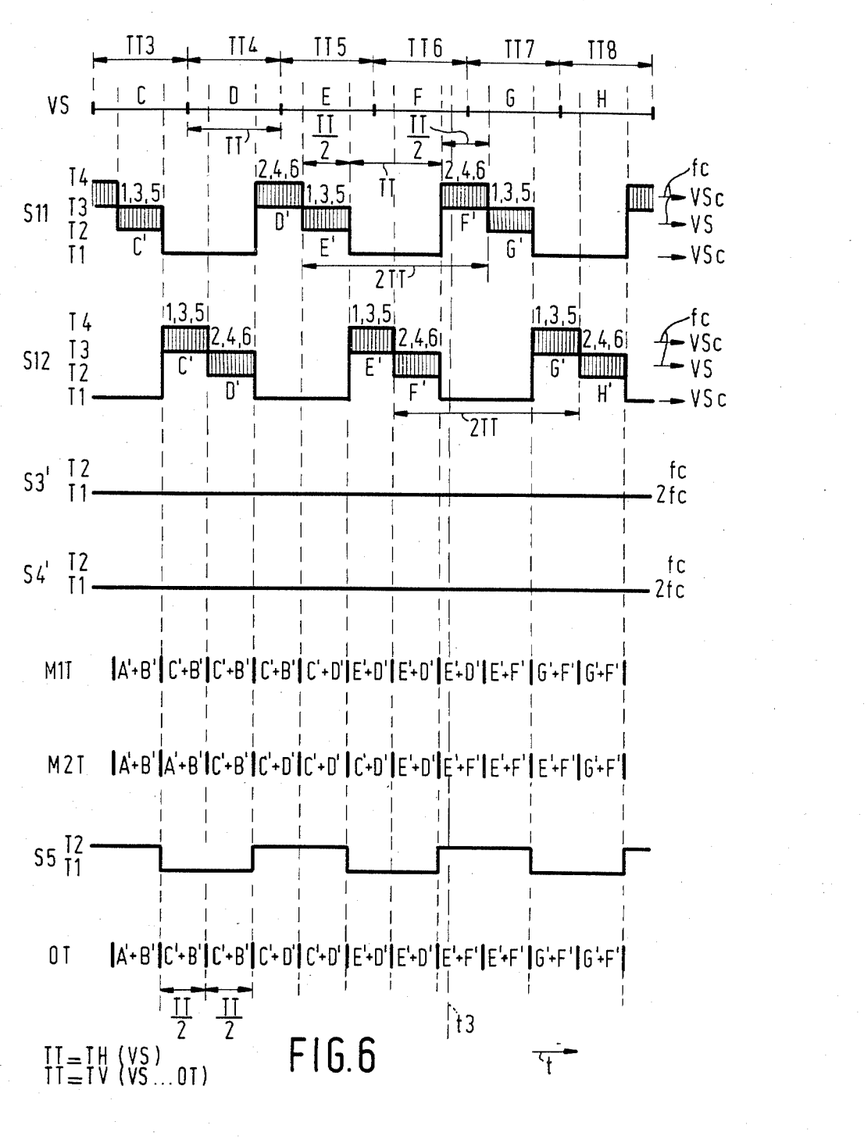
FIG. 6 illustrates a possible signal processing in this embodiment.

The diagrams shown in FIG. 6 are drawn for the case in which the picture part magnification is chosen for which, if the VS diagram of FIG. 6 applies both to the field time base with TT=TV and to the line time base with TT=TH, the central part of the picture is represented with a magnification factor equal to two. It follows from the diagrams S3' and S4' of FIG. 6 that the field memories M1 and M2 are continuously controlled by the clock signal of the clock frequency 2fc, so that the doubled reading and writing speeds are constantly present. According to the diagrams S11 and S12, a cycle then occurs which comprises two periods TT=TV. In the cycle indicated in FIG. 6 comprising the period 2TT, three parts can be distinguished, i.e. one part with a duration of a first period (TT)/2, one part comprising one period TT and one part comprising a second period (TT)/2. Since the cycle in the diagrams S11 and S12 of FIG. 6 is the same, but shifted through a period TT, only the cycle in the diagram S11 will be described in greater detail. In the diagram S11 of FIG. 6, it is shown that during the first period (TT)/2 of the period 2TT, the information E' is written into the field memory M1. The information is derived intermittently from the signal VS because at the clock shift frequency of 2fc in the field memory M1, the input T2 and the terminal T3 at the frequency fc are through-connected to the output T10 of the change-over circuit S11. This results in that, with an order of succession of picture points and an associated order of succession of storage locations of 1,2,3,4,5 etc., only the information of, for example, the picture points 1,3,5 etc. is written into the storage locations 1,3,5 etc. It is assumed that the storage locations 2,4,6 already contain information, which is not now changed (information D' in the diagram S11 of FIG. (6). In the next period TT of the cycle comprising the period 2TT, the information E'+D' is produced twice at the memory output M1T (FIG. 6). Through the change-over circuit S11, a circulation of information (arrow VSc in FIG. 6) takes place via the input T1, in the case in which the circulating memory (M1, S11) is used. The information E'+D' becomes available twice from the storage locations 1, 2,3,4,5,6 etc. via the change-over circuit S5 at the signal output OT (FIG. 6). It is stated again that instead of a circulating memory (M1, S11), use may be made of a repeatedly readable memory M1.

During the second period (TT)/2 of the cycle comprising the period 2TT in the diagram S11 of FIG. 6, the intermittent change-over at the frequency fc takes place between the input T4 and the terminal T3 of the change-over circuit S11. In this case, according to the diagram S12 of FIG. 6 and the position shown of the change-over circuits S11 and S12 of FIG. 5, the memory M2 operates with circulation(information E'+F'), whereby the information F' present in the storage locations 2,4,6 etc., is further stored in the storage locations 2,4,6 etc. of the memory M1 and replaces there the information D' (arrow VSc and the frequency fc in the diagram S11 of FIG. 6). Subsequently, according to the diagram S11 of FIG. 6, the information E' is replaced by the information G', after which, during the circulation (arrow VSc), the information G'+F' (originating from the storage locations 1,2,3,4,5,6 etc.) becomes available twice at the output OT.

A comparison of the diagram OT of FIG. 6 with that of FIG. 2, 3 and 4 shows that the order of succession of display of the pictures containing the informations E', E', F', F', G' etc. may be assumed to be replaced by an order of succession of display of pictures E'+D', E'+D', E'+F', E'+F', G'+F' etc. The result of the information combinations is an improved picture quality during display with reduced line flicker phenomena.

Leaving the described improvement of picture quality during display out of consideration, the circuit arrangement of FIG. 5 may be combined with a movement detetection circuit or a circuit with recursive signal processing, such as is sometimes used in noise reduction circuits. For further details about these circuits, reference is invited interalia to Dutch Patent Application No. 8,100,683 (PHN. 9947). The movement detection or the recursive signal processing can be effected only when signals are available which have a relative time delay of two field periods TV. The following facts can be derived from the diagrams of FIG. 6, considered on the field time base with TT=TV.

When the information E' is present at the signal input IT to be stored in the storage locations 1,3,5 of the memory M1 (diagram S11), according to FIG. 6 the information C' is available at the outputs M1T and M2T. Subsequently, the information E' becomes available at the output M1T and the information C' is available at the output M2T. Then the information F' is present at the signal input IT to be stored in the storage locations 2,4,6 of the memory M2 (diagram S12) and the information D' is available at the outputs M1T and M2T. Subsequently, the information F' becomes available at the output M2T and the information D' is available at the output M1T. It follows from FIG. 5 and 6 that information can be derived from the outputs OT1, OT2 and OT3 which have a relative time delay of two field periods TT=TV, as applies to the information C' and E', D' and F', E' and G', F' and H', etc., each time occurring in two periods (TT)/2.

It is found that the process of intermittently writing into the memories M1 and M2, in which the effective information writing time has been halved, leads to an optimum utilization of the information storage possibility and further yields the advantages of the possible movement detection and noise reduction. The use of the filtering circuit F1 shown in FIG. 1 is then no longer necessary.

Figure 7:
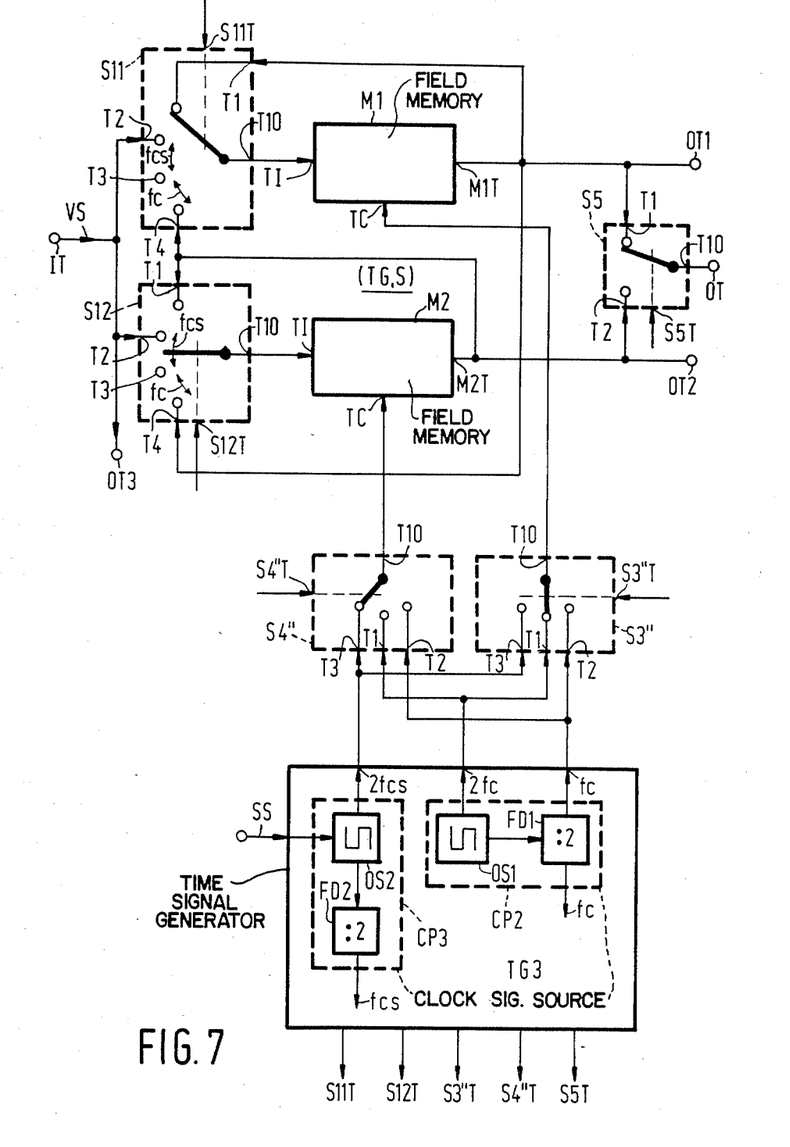
FIG. 7 shows a still further embodiment according to the invention.

FIG. 7 shows a television circuit arrangement according to the invention in which information supplied at a variable speed can be stored in an adapted manner in the field memories M1 and M2. With respect to the circuit arrangement shown in FIG. 5, that of FIG. 7 is provided with an adapted time signal generator TG3 and an adapted clock signal change-over circuit (S3″, S4″) present in a magnification control circuit (TG3, S3″, S4″, S11, S12). The time signal generator TG3 is provided with two clock signal sources CP2 and CP3. The clock signal source CP2 is a non-synchronized source which delivers the described clock signals of the clock frequencies 2fc and fc. The source CP2 comprises, for example, an oscillator OS1 and a frequency divider FD1 with a factor 2. The clock signal source CP3 is a synchronized source to which a synchronization signal SS is supplied and which delivers clock signals of clock frequencies 2fcs and fcs. The source CP3 comprises, for example, a synchronized oscillator OS2 and a frequency divider FD2 with a factor 2. The change-over circuit S3″ and S4″ are each provided with three signal inputs T1,T2 and T3, to which clock signals of the clock frequencies 2fc, fc and 2fcs, respectively, are supplied from the time signal generator TG3. At the inputs T4 and the terminals T3 of the change-over circuits S11 and S12, there is indicated by the arrow fc that the process of intermittently writing into the memories M1 and M2 is effected at this frequency. The process of intermittently writing via the inputs T2 and the terminals T3 of the change-over circuits S11 and S12 is effected at the synchronized clock frequency fcs.

Figure 8:
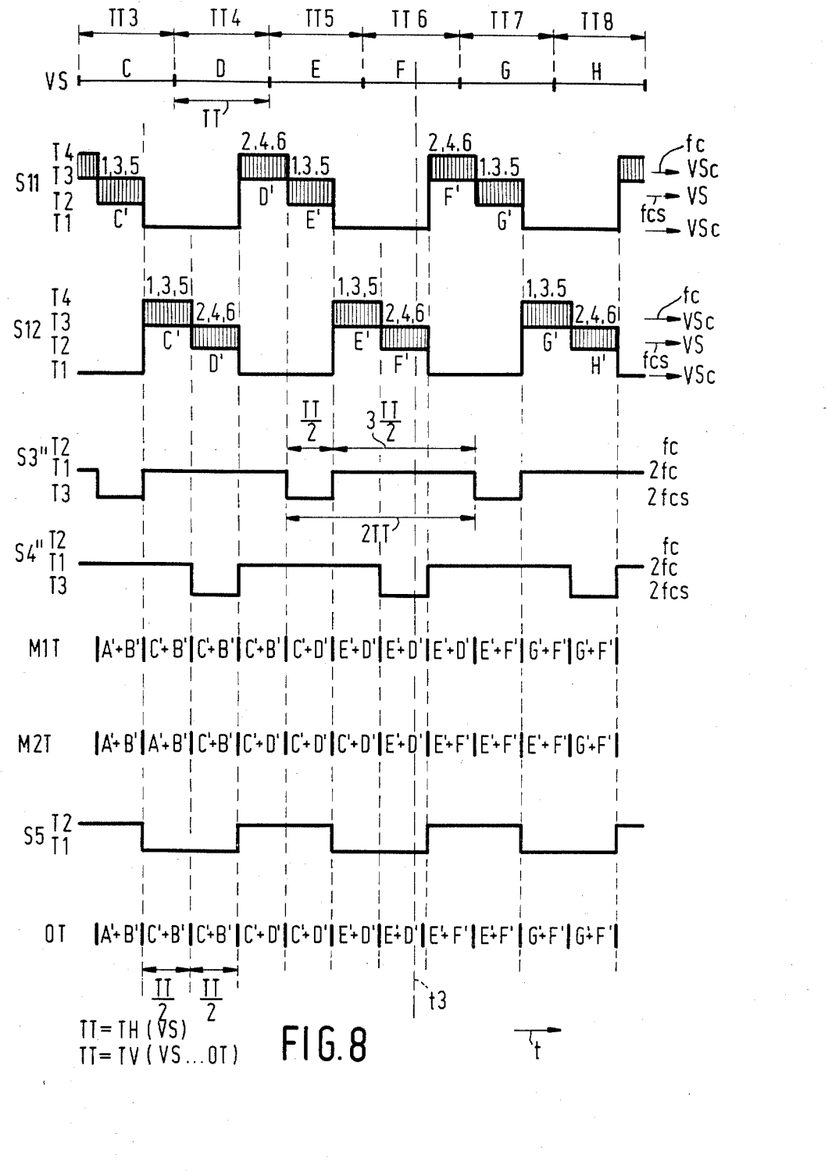
FIG. 8 illustrates a possible signal processing in the embodiment of FIG. 7.

The diagrams of FIG. 8 are comparable with those of FIG. 6, whereby there is an essential difference between the diagrams S3″ and S4″, on the one hand, and the diagrams S3' and S4', on the other hand. It appears from the diagram S3″ that, when the information supplied to the signal input IT (VS: C, E, G) is written into the field memory M1, the clock shift frequency is equal to 2fcs, while the intermittent change-over according to the diagram S11 is effected at the frequency fcs. The period (TT)/2 is followed by three periods (TT)/2 in which the clock shift frequency in the memory M1 is equal to 2fc and in which, during the last period (TT)/2 thereof, an intermittent change-over according to the diagram S11 is effected at the frequency fc. The same control is effected in the field memory M2, but shifted through a period TT. The possibility of the synchronized information storage in the memories M1 and M2 is of importance for a variable supply of information to the input IT, such as is effected, for example, by tape recording and reproducing apparatus. The separation between the clock signal sources CP2 and CP3 for the variable information storage and the stable information reproduction, respectively, in the picture part magnification is then advantageous.

Figure 9:
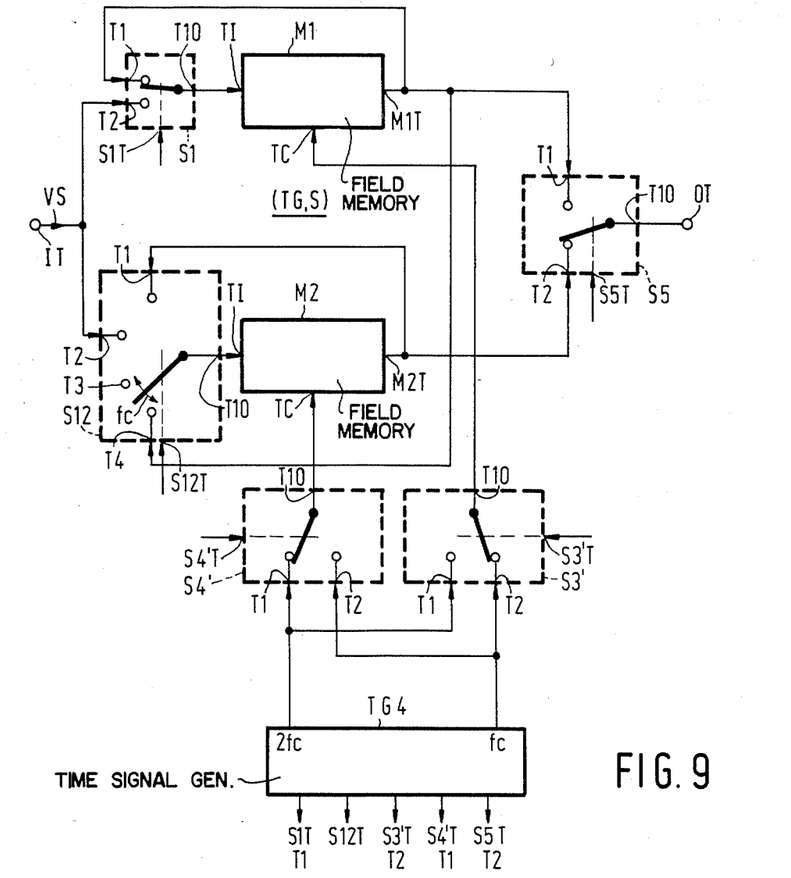
FIG. 9 shows a further according to the invention.

The embodiment of the television circuit arrangement according to the invention shown in FIG. 9 is suitable for picture part magnification with a stationary television picture, whereby picture parts to be magnified can be selected according to desire. As compared with the television circuit arrangements shown in FIGS. 1 and 5, the field memories M1 and M2 and the change-over circuits S1, S3', S4', S5 and S12 are present. A time signal generator TG4 is present, which supplies only to the input S12T of the change-over circuit S12 a signal varying with the time t. In the manner shown in FIG. 9, the further change-over circuits are invariably through-connected and these fixed through-connections are indicated in a corresponding manner at the outputs of the time signal generator TG4. The circuit arrangement shown in FIG. 9 comprises a magnification control circuit (TG4, S3', S4', S12), of which a clock signal change-over circuit (S3', S4') and a further change-over circuit (S12) form part.

Figure 10:
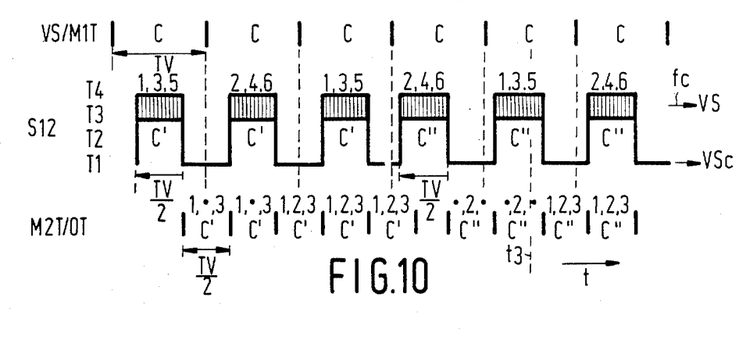
FIG. 10 illustrates a possible signal processing in the embodiment of FIG. 9.

In FIG. 10, a diagram VS/M1T indicates the information C, as it is repeatedly emitted by the field memory M1 with a repetition period equal to the field period TV. During display, the information C corresponds to a stationary television picture, which is selected from a series of television pictures comprising informations A, B, C, D, E etc. Under the control of the clock signal at the clock frequency fc, the information C circulates in the circulating memory (M1, S1). Another possible embodiment may comprise a repeatedly non-destructively readable field memory M1.

In FIG. 10, the diagram S12 indicates how the process of intermittently writing into the memory M2 can be effected via the signal input T4 and the terminal T3 (Vs, fc), whereby further the signal circulation takes place via the input T1 (VSc). It is assumed that the control part of the picture is selected for magnification by a factor two, which corresponds to the information C'. In FIG. 10, the information C' is indicated on the field time base with the field period TV. Considered on the line time base, the central part of the line periods in the selected part of the field periods is then selected in a corresponding manner. A shifted line part of half a line period may also be selected.

The process of intermittently writing into the storage locations 1, 3, 5 etc. of the field memory M2 results, as is indicated in the diagram M2T/OT, in that during display, the information C' is present in the order of succession 1, ., 3 etc., because it was assumed that the even-numbered storage locations were not yet filled with information. Subsequently, during the process of intermittent writing, the even-numbered storage locations 2,4,6 etc. are filled with the information C', after which according to the diagram M2T/OT the information C' is available in the order of succession of picture points 1, 2, 3 etc. during each half field period (TT)/2 for the display with the magnification factor two.

If then another picture part is selected for magnification, which corresponds, for example, to the information C", and if the intermittent writing into field memory M2 takes place in the even-numbered storage locations 2, 4, 6 etc., the information C" is present in the order of succession of picture points ., 2,. etc., after which the odd-numbered storage locations 1, 3, 5 etc. are filled. Subsequently, the information C" is present for display in the order of succession of picture points 1, 2, 3 etc., as is indicated in the diagram M2T/OT.

It appears from the circuit arrangement of FIG. 9 that the intermittent writing of information can be used already advantageously when a single field memory (S12) is employed. In the case of the more effective information storage a filtering circuit of the kind described in FIG. 1 (circuit F1) is not desired.

What is claimed is:

1. A television circuit arrangement for field and line frequency doubling and picture part magnification, said television circuit arrangement comprising a signal input for receiving information and a signal output for supplying information; first and second field memories arranged in parallel between said signal input and said signal output, each field memory having a signal input, a signal output and a clock signal input; a write/read circuit having first means for coupling the signal input of said television circuit arrangement to the signal inputs of said first and second field memories, respectively, second means for coupling the signal outputs of said first and second field memories, respectively, to the signal output of said television circuit arrangement, and a clock signal source circuit coupled to said first and second coupling means and said clock signal inputs of said first and second field memories, respectively, said write/read circuit controlling writing of said information into said first and second field memories, respectively, during alternate field periods, each field period including line periods, for a writing time equivalent to a field period at a given writing speed, and reading of said information twice from said first and second field memories, respectively, during a field period following the field period in which said first and second field memories, respectively, are written, for a reading time equivalent to a field period at a reading speed which is substantially twice the writing speed; and a magnification control circuit, coupled to said first and second field memories and said write/read circuit, for providing said picture part magnification, characterized in that said magnification control circuit comprises a clock signal change-over circuit coupled to said clock signal source for selectively modifying the clock signals therefrom, whereby, during the writing of said information into said first and second field memories, the writing speed is selectively made higher than said given writing speed during a part of the field periods and of the line period in said writing time, which part is substantially inversely proportional to the ratio between said higher writing speed and said given writing speed.

2. A television circuit arrangement as claimed in claim 1, characterized in that the first and second field memories can be stopped without a substantial loss of information, whereby in the writing time outside said inversely proportional part of the field periods and of the line periods, the clock signal supplied to the respective clock signal input is interrupted.

3. A television circuit arrangement as claimed in claim 1, characterized in that the first and the second field memories are circulating memories, whereby, in order to obtain a continuous circulation after said inversely proportional part of the field periods and of the line periods, until there is read twice in a field period, a clock signal is applied to the respective clock signal input for simultaneous reading and writing, which is sufficient for a single circulation.

4. A television circuit arrangement as claimed in claim 3, characterized in that said single circulation in the respective first and second field memory is effected with a circulation time within which, in a part thereof, the reading/writing speed is equal to said reading speed and, in the remaining part thereof, the reading/writing speed is equal to said given writing speed, the average value of the two reading/writing speeds being sufficient for the single circulation.

5. A television circuit arrangement as claimed in claim 1, characterized in that said inversely proportional part of the field periods and of the line periods is displaceable in the periods.

6. A television circuit arrangement as claimed in claim 1 or 5, characterized in that said higher writing speed is substantially equal to said reading speed.

7. A television circuit arrangement as claimed in claim 1, characterized in that when said clock signals are selectively modified, during said inversely proportional part of the field periods and of the line periods, said first coupling means intermittently couples the signal input of said television circuit arrangement to the signal inputs of said first and second field memories, respectively, whereby an effective information writing time in the field memory is equal to substantially half said inversely proportional part of the field periods and of the line periods.

8. A television circuit arrangement as claimed in claim 7, characterized in that said first coupling means comprises first and second change-over circuits each having a first and a second signal input, a signal output and a control signal input, in which said first and second signal inputs are selectively coupled to said signal output, said first signal inputs of said first and second change-over circuits being coupled to said signal input of said television circuit arrangement, said second signal inputs being coupled to said signal outputs of said second and first field memories, respectively, said signal outputs being coupled to the signal inputs of said first and second field memories, respectively, and said control signal inputs being coupled to said clock signal source circuit.

9. A television circuit arrangement as claimed in claim 8, characterized in that said clock signal source circuit comprises a first and a second clock signal source, which are selectively coupled via said clock signal change-over circuit to the clock signal inputs of the first and second field memories and determine the writing and reading speed therein and which further determine said intermittent writing through said first and second change-over circuits, the first and second clock signal sources being, respectively, a non-synchronized and a synchronized clock signal source, the synchronized second clock signal source being operative with the respective first or second change-over circuit and the respective first or second field memory, of which the signal input thereof is connected, intermittently, to the signal input of the television circuit arrangement.

10. A television circuit arrangement as claimed in claim 9, characterized in that the first and second clock signal sources are alternately coupled to the clock signal inputs of said first and second field memories, respectively, for a period of two field periods shifted through a field period, wherein the synchronized second clock signal source is coupled to the respective clock signal input during a half-field period whereafter the non-synchronized first clock signal source is coupled to the respective clock signal input during three half-field periods.

11. A television circuit arrangement as claimed in claim 9, characterized in that the television circuit arrangement is provided with three further signal outputs which are coupled, respectively to the signal output of the first field memory, the signal output of the second field memory and the signal input of the television circuit arrangement, respectively.

* * * * *